United States Patent
Hoshi et al.

(10) Patent No.: US 12,434,542 B2
(45) Date of Patent: Oct. 7, 2025

(54) REGISTER DEVICE FOR VEHICLE

(71) Applicants: SHIGERU CO., LTD., Ota (JP); SUBARU CORPORATION, Tokyo (JP)

(72) Inventors: Kazuaki Hoshi, Ota (JP); Hiroshi Nakamura, Tokyo (JP)

(73) Assignees: SHIGERU CO., LTD., Ota (JP); SUBARU CORPORATION, Tokoyo (JP)

( * ) Notice: Subject to any disclaimer, the term of this patent is extended or adjusted under 35 U.S.C. 154(b) by 305 days.

(21) Appl. No.: 17/973,952

(22) Filed: Oct. 26, 2022

(65) Prior Publication Data

US 2023/0137960 A1   May 4, 2023

(30) Foreign Application Priority Data

Nov. 2, 2021   (JP) .................. 2021-179326

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .................. B60H 1/3421; B60H 2001/3471
(Continued)

(56) References Cited

U.S. PATENT DOCUMENTS

| 4,665,804 | A |   | 5/1987 | Miyasaka |
| 5,741,179 | A | * | 4/1998 | Sun ..................... B60H 1/3414 454/316 |

(Continued)

FOREIGN PATENT DOCUMENTS

| DE | 102019006529 A1 | * | 3/2021 |
| JP | S61-128058 A |   | 6/1986 |

(Continued)

OTHER PUBLICATIONS

Japan Patent Office, Notice of Reasons for Refusal for Japanese Patent Application No. 2021-179326, Feb. 4, 2025.

*Primary Examiner* — Avinash A Savani
*Assistant Examiner* — Dana K Tighe
(74) *Attorney, Agent, or Firm* — Jodi A. Reynolds, Esq.; Harter Secrest & Emery LLP

(57) ABSTRACT

A register device includes a register body, a plurality of upstream fins, a single downstream fin and an operation knob. The plurality of upstream fins are supported by the register body so as to be rotatable about a rotation axis extending in a left-right direction. The plurality of upstream fins are arranged in a vertical direction. The downstream fin is disposed in an air passage on a blow outlet side with respect to the upstream fins. The downstream fin is supported by the register body so as to be rotatable about a rotation axis extending in the vertical direction. The downstream fin extending in the vertical direction includes a pair of flat plate portions extending in the vertical direction parallel to each other. The operation knob is supported by the downstream fin so as to be slidable in the vertical direction. The operation knob, as it is slid, rotatably operates the upstream fins. The operation knob is disposed between the pair of flat plate portions so as to be fit in a space between the pair of flat plate portions in the left-right direction.

5 Claims, 8 Drawing Sheets

(58) Field of Classification Search
USPC .......................................................... 454/154
See application file for complete search history.

(56) References Cited

U.S. PATENT DOCUMENTS

| | | | | |
|---|---|---|---|---|
| 9,162,551 | B2* | 10/2015 | Yamamoto | B60H 1/3428 |
| 10,792,976 | B2* | 10/2020 | Wada | B60H 1/0065 |
| 11,820,205 | B2* | 11/2023 | Lee | B60H 1/3421 |
| 2021/0300157 | A1* | 9/2021 | Kim | B60H 1/3421 |

FOREIGN PATENT DOCUMENTS

| | | | |
|---|---|---|---|
| JP | 3175092 U | | 4/2012 |
| JP | 3176136 U | | 6/2012 |
| JP | 2021070399 A | * | 5/2021 |

* cited by examiner

REGISTER DEVICE FOR VEHICLE

CROSS-REFERENCE TO RELATED APPLICATIONS

The present application claims priority from Japanese Patent Application No. 2021-179326 filed on Nov. 2, 2021, the entire contents of which are hereby incorporated by reference.

BACKGROUND

The present technology relates to a register device for a vehicle for blowing out an air from an air conditioning device or outside of a vehicle body to an interior of the vehicle.

Japanese Unexamined Patent Application Publication No. S61-128058 discloses a register device mounted in an instrument panel of a vehicle. The register device includes a housing having an air passage, a plurality of movable current plates disposed on an upstream side of the air passage, a louver disposed on a downstream side of the air passage and an operation knob that operates the movable current plates.

The air passage of the housing has a configuration in which dimensions in a left-right direction is greater than dimensions in a vertical direction. The louver is formed in a shape of a box. The louver is supported by the housing so as to be rotatable about a rotation axis extending in the left-right direction. The louver has five fixed current plates inside thereof. The fixed current plates extending in the left-right direction are arranged in the vertical direction, parallel to each other.

Each of the plurality of movable current plates is supported by upper and lower walls of the louver so as to be rotatable about a rotation axis extending in the vertical direction. The plurality of movable current plates are disposed side by side in the left-right direction. The operation knob is supported by the fixed current plates of the louver. The operation knob is slidably operated to be moved in the left-right direction, thereby rotatably operating the movable current plates.

SUMMARY

One embodiment of the present technology provides a register device for a vehicle. The register device for the vehicle includes a register body, a plurality of first fins, a single second fin and an operation knob.

The register body includes an air passage having a configuration in which a dimension in a first direction is smaller than a dimension in a second direction orthogonal to the first direction. Each of the plurality of first fins is supported by the register body so as to be rotatable about a first rotation axis extending in the first direction. The first fins are arranged in the second direction.

The second fin is disposed in the air passage at a location on a blow outlet side with respect to the first fins. The second fin is supported by the register body so as to be rotatable about a second rotation axis extending in the second direction. The second fin extends in the second direction. The operation knob is supported by the second fin so as to be slidable in the second direction. The operation knob, as it is slid, rotatably operates the first fins.

The second fin includes a pair of flat plate portions extending in the second direction parallel to each other. The operation knob is disposed between the pair of flat plate portions so as to be fit in a space between the pair of flat plate portions in the first direction.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
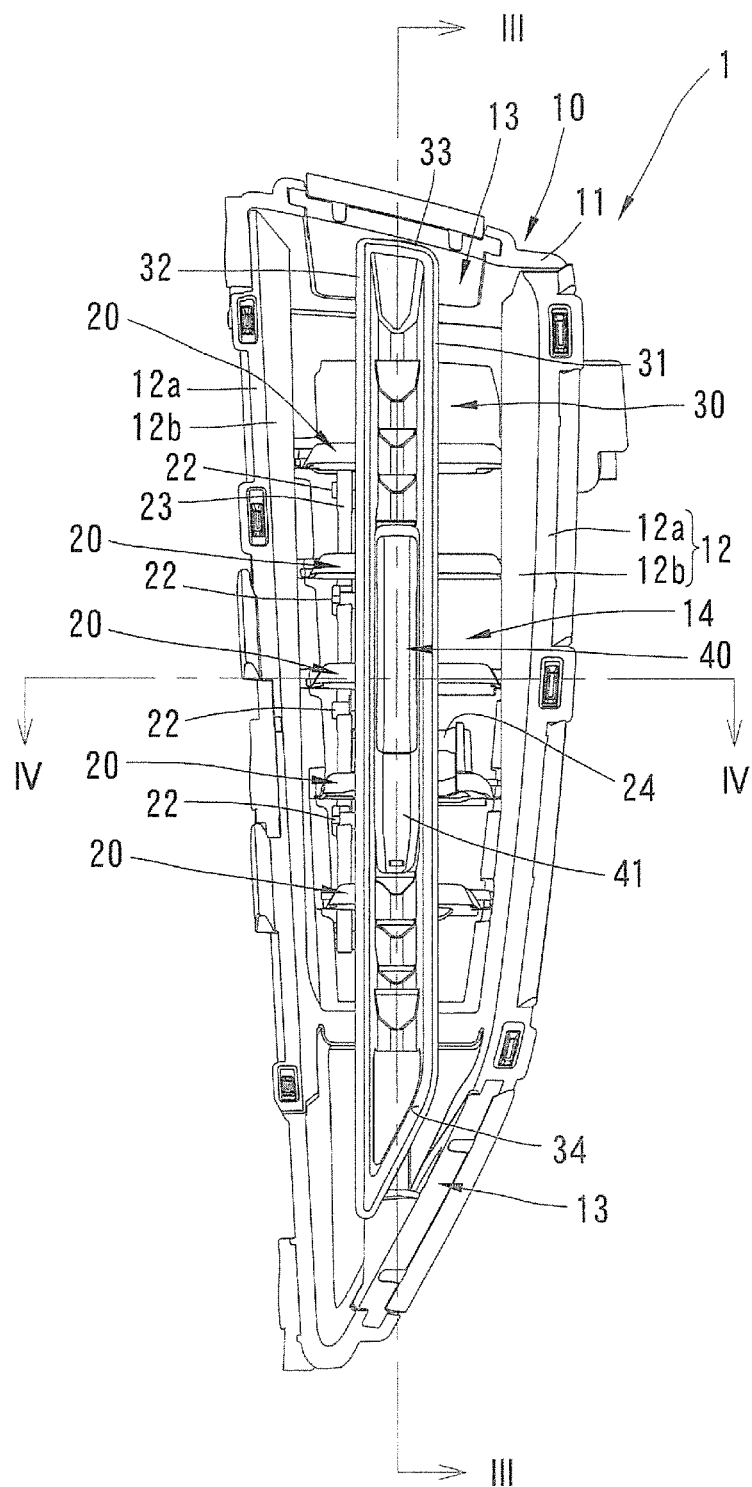
FIG. 1 is a front view of a register device according to one embodiment of the present technology in a state in which an operation knob is in a base position.

In the register device disclosed in the Japanese Unexamined Patent Application Publication No. S61-128058, the operation knob is disposed over a fixed current plate of the louver located in a middle in the vertical direction, between fixed current plates immediately above and below the fixed current plate in the middle. Because of this arrangement, a dimension of the operation knob in the vertical direction is increased, compromising aesthetic quality, and posing an obstacle to formation of the air passage of the housing in a more horizontally-elongated flattened configuration. Therefore, it is desired to provide a register device for a vehicle that solves the problem mentioned above.

In the following, some example embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Figure 2:
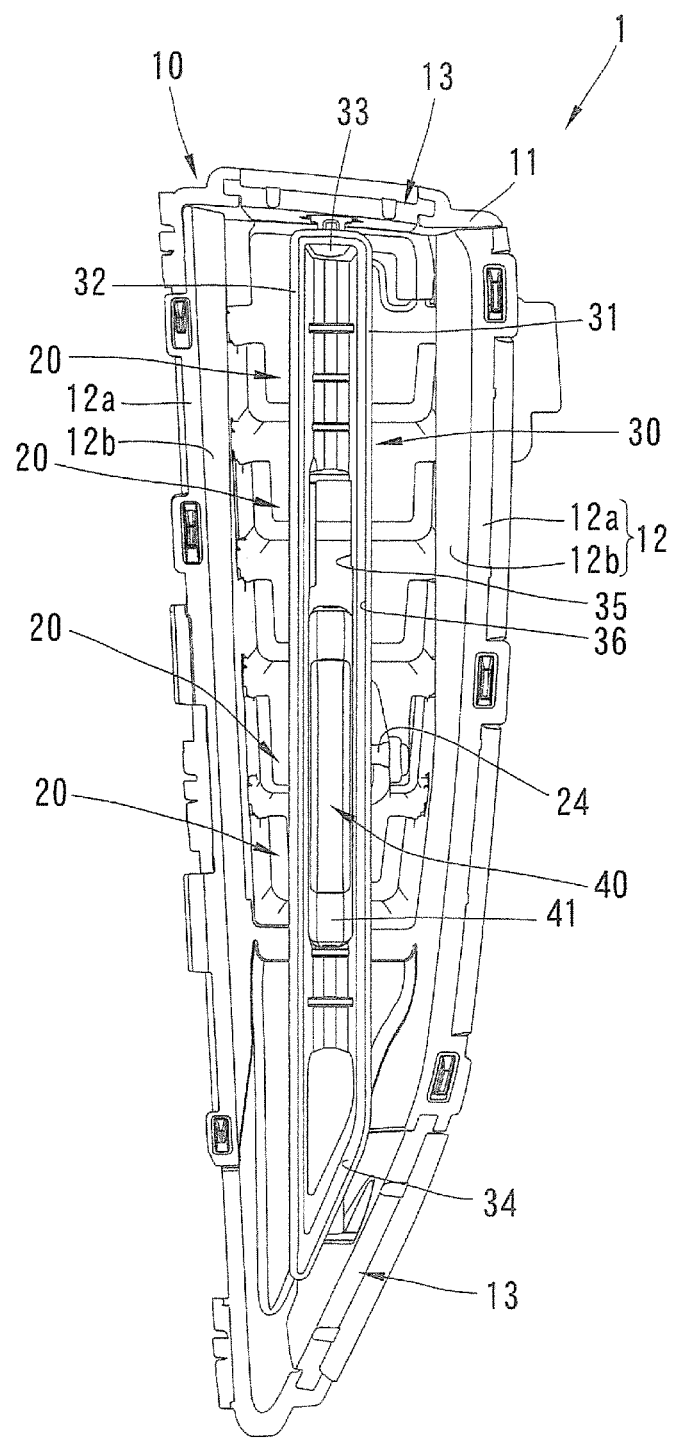
FIG. 2 is a front view of the register device in a state in which the operation knob is in a closing position.

One embodiment of the present technology is described hereinafter with reference to FIGS. 1 to 7. FIGS. 1 and 2 show a register device disposed in an instrument panel (interior panel) of a vehicle. The register device blows temperature-conditioned air from an air conditioning device and air from outside of a vehicle body to an interior of the vehicle. In the following description of the register device, front-rear and left-right directions of the register device are determined in accordance with front-rear and left-right directions of the vehicle.

The register device 1 includes a register body 10, a plurality of upstream fins (first fins) 20, a single downstream fin (second fin) 30 and an operation knob 40.

Figure 3:
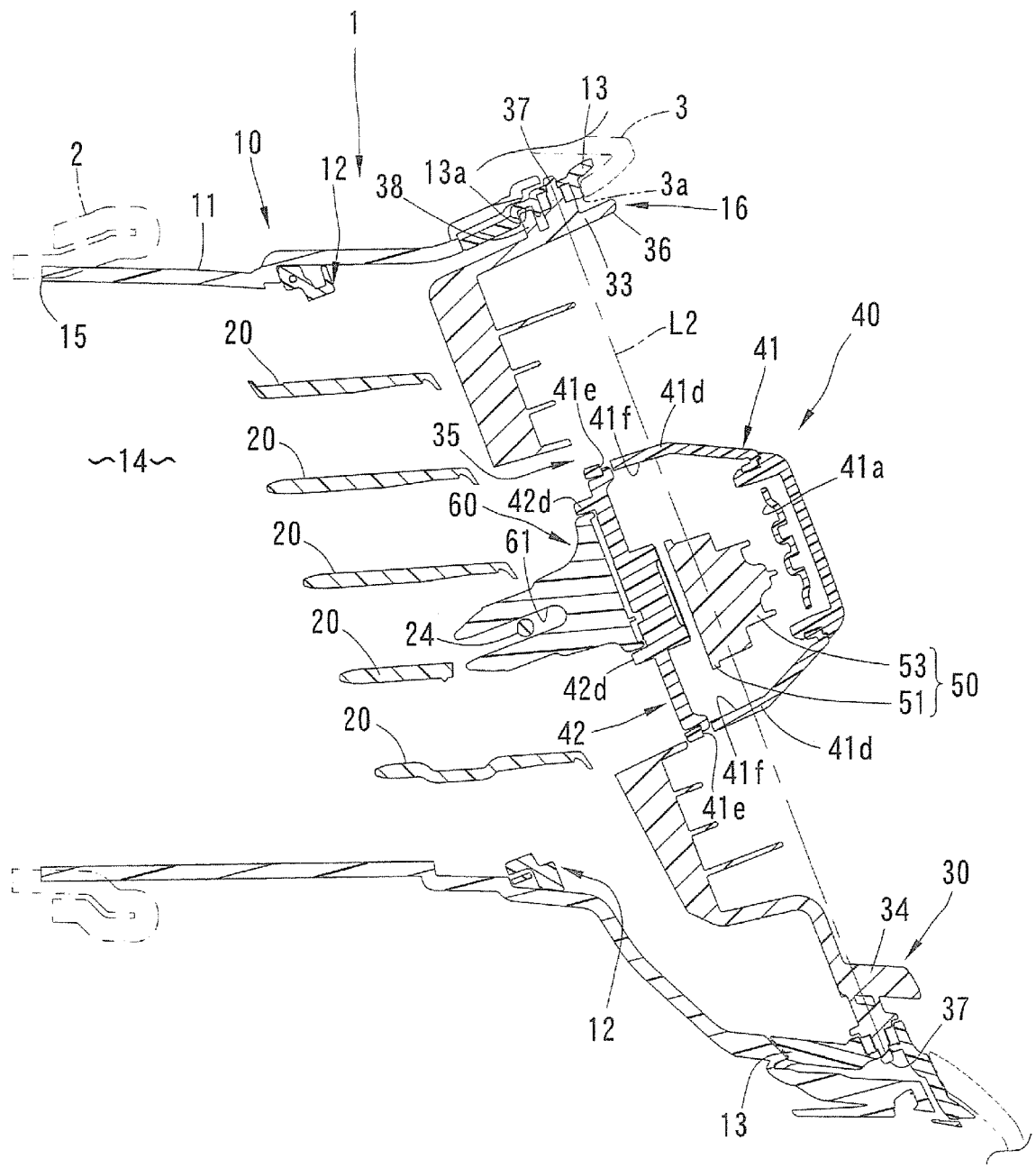
FIG. 3 is a cross-sectional view taken along line III-III of FIG. 1.
Figure 4:
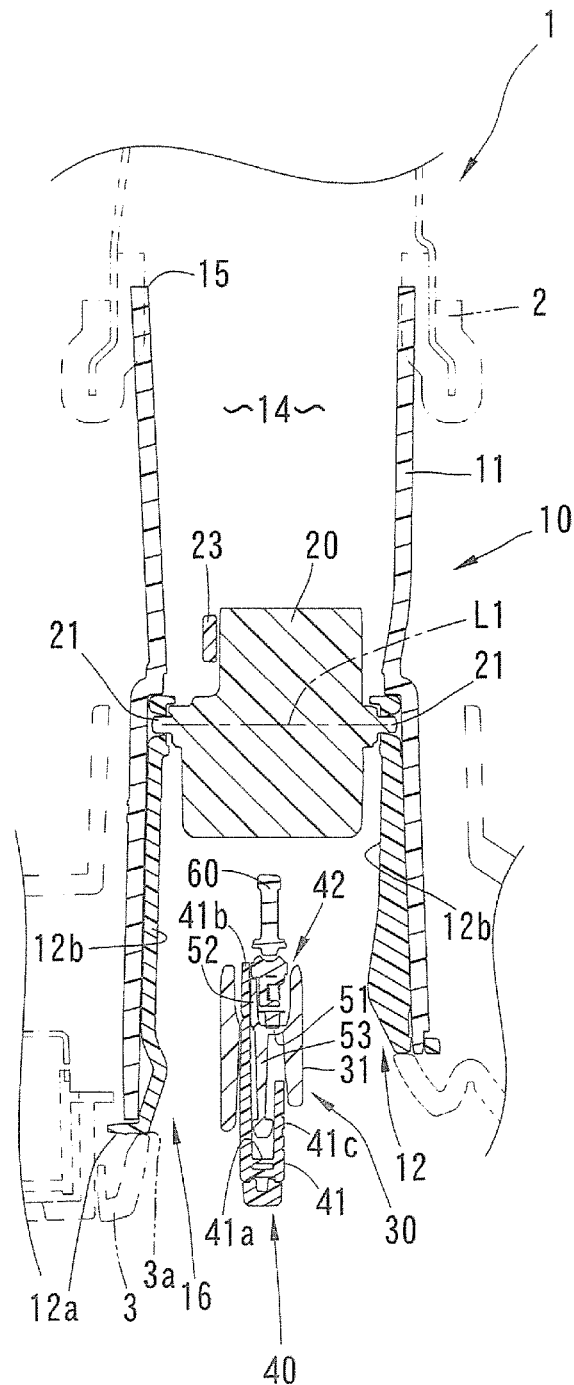
FIG. 4 is a cross-sectional view taken along line IV-IV of FIG. 1.

As shown in FIGS. 1, 3 and 4, the register body 10 includes a main portion 11 having a cylindrical configuration extending in the front-rear direction, a bracket 12 supporting the upstream fins 20 and two brackets 13, 13 supporting the downstream fin 30.

The register body 10 includes an air passage 14 inside thereof. The air passage 14 has a flattened configuration with its dimension in a vertical direction (second direction) greater than its dimension in a left-right direction (first direction). The register body 10 has a laterally-facing trapezoidal configuration when viewed from front. An upstream end of the air passage 14 serving as an air inlet 15 is connected to a duct 2 from the air conditioning device or the outside of the vehicle. A downstream end of the air passage 14 serving as a blow outlet 16 is connected to an opening 3a formed in the instrument panel 3.

The bracket 12 has an annular configuration and includes flange portions 12a, 12a on left and right sides thereof on the blow outlet 16 side. The flange portions 12a, 12a are caught by an end face of the main portion 11 on the blow outlet 16 side. Left and right wall portions 12b, 12b respectively continuing from the flange portions 12a, 12a extend up to a middle portion of the air passage 14 toward the air inlet 15.

The brackets 13, 13 are respectively caught by an upper portion and a lower portion of the main portion 11 on the blow outlet 16 side. The bracket 12 and the brackets 13, 13 constitute a portion of the blow outlet 16.

As shown in FIGS. 1 and 3, five upstream fins 20 are provided in this embodiment. The upstream fins 20 are disposed in the air passage 14 at a generally middle portion between the air inlet 15 and the blow outlet 16. Each of the upstream fin 20 has a plate-like configuration, with respective plate surfaces oriented upward and downward. The upstream fins 20 are disposed spaced from each other in the vertical direction. As shown in FIG. 4, each of the upstream fins 20 is supported by the left and right wall portions 12b, 12b of the bracket 12 of the register body 10 at support shafts 21, 21 respectively protruded leftward and rightward. The upstream fin 20 is rotatable about a rotation axis L1 (first rotation axis) extending through the support shafts 21, 21.

As shown in FIG. 1, each of the upstream fins 20 includes a connecting pin 22 extending parallel to the rotational axis L1 at a back side (front in a longitudinal direction of the vehicle) of the left support shaft 21. The connecting pins 22 are rotatably connected with a connecting link 23 extending in the vertical direction. This arrangement allows all of the other upstream fins 20 to be tilted synchronously when one of the upstream fins 20 is tilted.

As shown in FIGS. 1 and 3, one of the five upstream fins 20 (the upstream fin 20 located at second from a bottom in this embodiment) has a cutout end portion and a transmitting shaft 24 extending in the left-right direction on the blow outlet 16 side. The transmitting shaft 24 coordinates with the operation knob 40 as will be described later.

Figure 6:
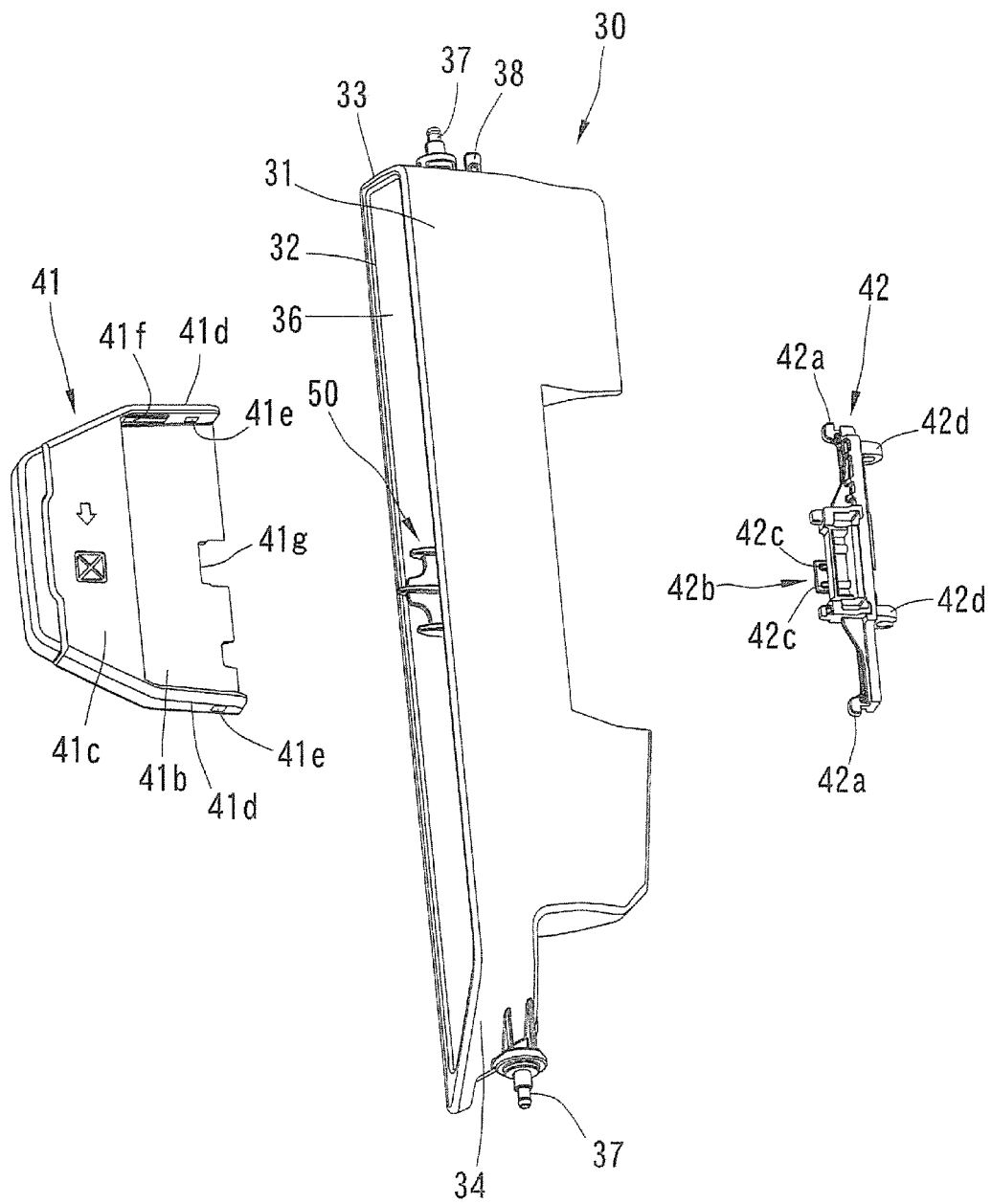
FIG. 6 is an exploded perspective view, showing the second fin and the operation knob.
Figure 7:
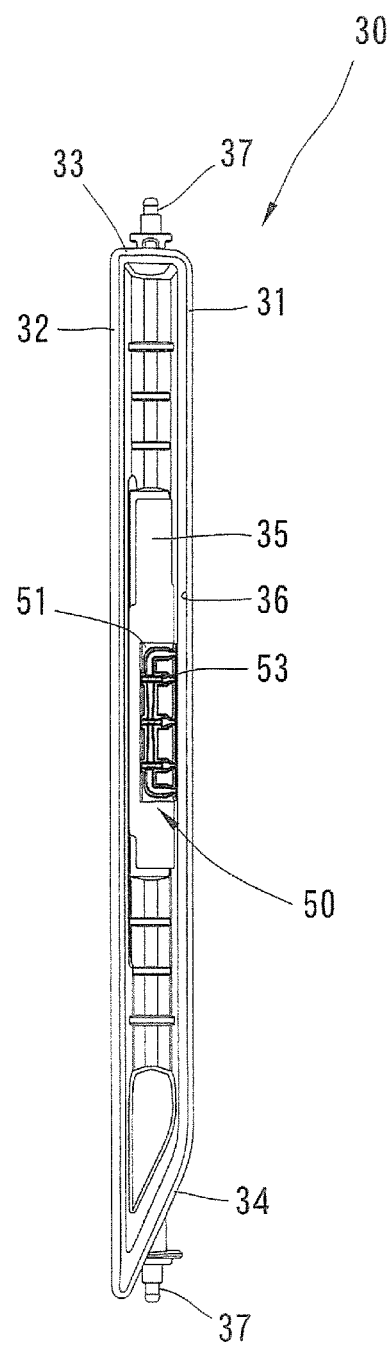
FIG. 7 is a front view of the second fin.

The downstream fin 30 is disposed in the air passage 14 at a location on the blow outlet 16 side with respect to the upstream fins 20. The downstream fin 30 has a flattened hollow configuration. As shown in FIGS. 1, 6 and 7, the downstream fin 30 includes a pair of flat plate portions 31, 32 extending in the vertical direction parallel to each other. Plate surfaces of the flat plate portions 31, 32 are oriented in the left-right direction.

The pair of flat plate portions 31, 32 have respective upper portions and respective lower portions connected via connecting plate portions 33, 34. The downstream fin 30 has an air inlet 35 formed in a middle portion thereof in the vertical direction on an upstream side. The air inlet 35 is formed so as to extend in the vertical direction between the flat plate portions 31, 32. Portions of the downstream fin 30 above and below the air inlet 35 are closed. The air inlet 35 is formed corresponding to a slidable region of the operation knob 40 to be described later. A blow outlet 36 is formed by the flat plate portions 31, 32 and the connecting plate portions 33, 34 on a downstream side of the downstream fin 30. Accordingly, an air passageway is formed between the pair of flat plate portions 31, 32 inside the downstream fin 30.

Support shafts 37, 37 are respectively protruded upward and downward from the connecting plate portions 33, 34. As shown in FIG. 3, the downstream fin 30 is supported by the upper and lower brackets 13, 13 of the register body 10 at the upper and lower support shafts 37, 37. The downstream fin 30 is rotatable about a rotation axis L2 (second rotation axis) extending through the support shafts 37, 37.

The connecting plate portion 33 on an upper side includes an engagement pin 38 extending parallel to the rotation axis L2 on a back side of the support shaft 37. The engagement pin 38 is slidably engaged with a limiting groove 13a formed in the bracket 13 on an upper side. The limiting groove 13a extends in a circular arc configuration about the rotation axis L2. The downstream fin 30 has a range of rotation thereof limited by the limiting grove 13a.

As shown in FIG. 7, of the pair of flat plate portions 31, 32, the flat plate portion 31 of the downstream fin 30 is provided with a slide-supporting portion 50 at a location corresponding to the air inlet 35.

Figure 5A:
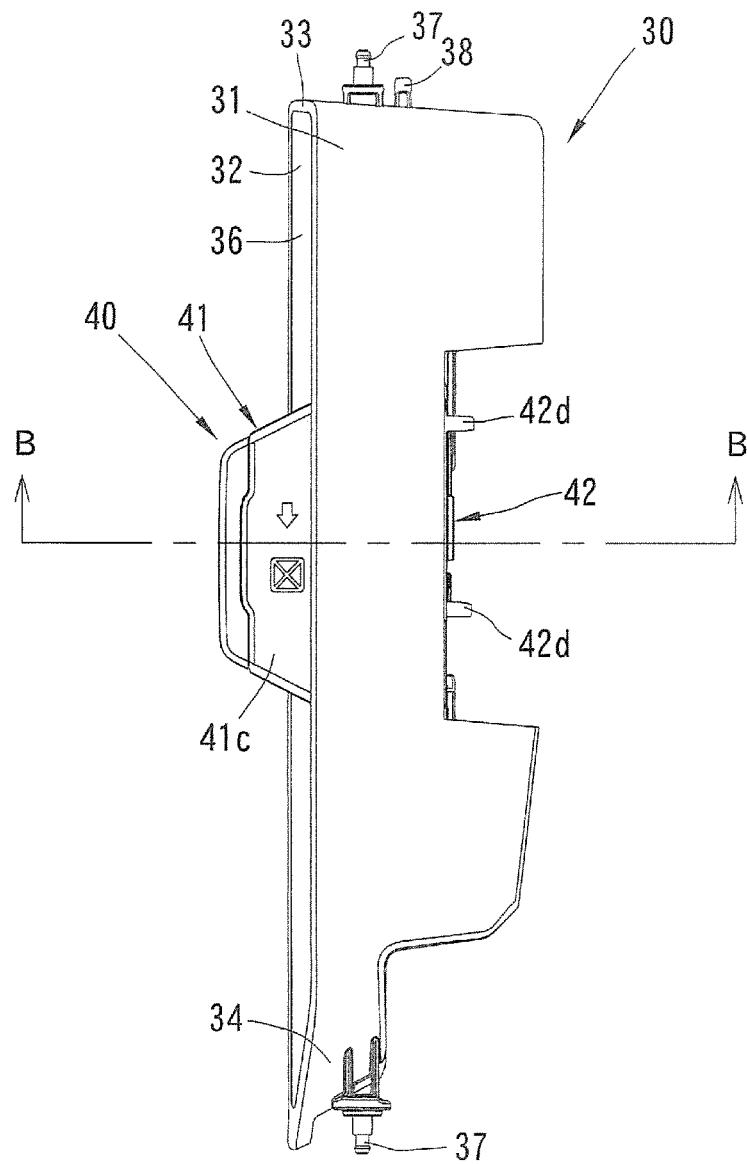
FIG. 5A is a perspective view, showing a second fin and the operation knob of the register device.
Figure 5B:
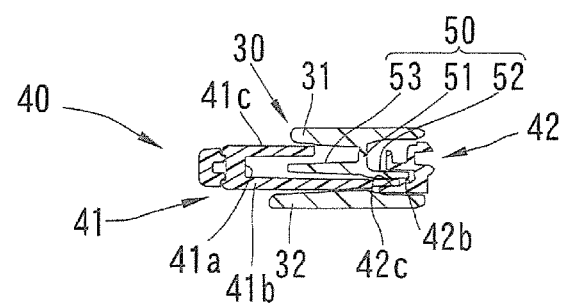
FIG. 5B is a cross-sectional view taken along line B-B of FIG. 5A.

The slide-supporting portion 50 slidably supports the operation knob 40 to be described later. As shown in FIG. 5B, the slide-supporting portion 50 includes a base portion 51, a slide-supporting piece 52 and a mark piece 53. The base portion 51 is formed in a flat plate configuration extending from one flat plate portion 31 to the other flat plate portion 32. The slide-supporting piece 52 extends from a distal end portion of the base portion 51 toward the air inlet 35 in a cantilever manner. The mark piece 53 extends from the distal end portion of the base portion 51 toward the blow outlet 36 in a cantilever manner.

The operation knob 40 rotationally operates the upstream fins 20 and the downstream fin 30. The operation knob 40 has a flat configuration and is supported by the slide-supporting portion 50 of the downstream fin 30. As shown in FIG. 3, the operation knob 40 includes a knob body 41 and a supported member 42.

A width of the knob body 41 is reduced from one end on the supported member 42 side toward the other end. The width of the knob body 41 is greater than a length of the slide-supporting portion 50 of the downstream fin 30 in the vertical direction. As shown in FIG. 1, a thickness of the knob body 41 (length in the left-right direction) is generally same as a distance between the pair of flat plate portions 31, 32 of the downstream fin 30.

As shown in FIGS. 5B and 6, the knob body 41 has a generally L-shaped cross-sectional configuration. The knob body 41 includes a bottom wall 41a on a downstream side. A long wall 41b and a short wall 41c respectively extend from left and right end portions of the bottom wall 41a. As shown in FIG. 6, limiting walls 41d, 41d are provided to close upper ends and lower ends of the long wall 41b and the short wall 41c. Each of the limiting walls 41d extends to a distal end of the long wall 41b. A catch hole portion 41e for mounting the supported member 42 is formed in a distal end portion of the each of the limiting walls 41d.

An abutment portion 41f is disposed in each of the limiting walls 41d on the bottom wall 41a side with respect to the catch hole portion 41e. The base portion 51 of the slide-supporting portion 50 is abutted against the abutment portion 41f, thereby limiting the slidable region of the operation knob 40 as will be described later. A cutout 41g is formed in a middle portion of a distal end portion of the long wall 41b in the vertical direction.

The supported member 42 is attached to a one end portion of the knob body 41 on a side opposite to the bottom wall 41a. When the operation knob 40 is assembled, the supported member 42 is slidably supported by the slide-supporting portion 50 of the downstream fin 30.

As shown in FIG. 6, the supported member 42 has an elongated configuration elongated in the vertical direction. The supported member 42 includes catch protrusions 42a, 42a having a hook configuration in an upper end portion and a lower end portion thereof. The catch protrusions 42a, 42a are caught by the catch hole portions 41e, 41e of the knob body 41. By this means, the supported member 42 is attached to the knob body 41.

As with the knob body 41, a thickness of the supported member 42 (length in the left-right direction) is generally same as the distance between the pair of flat plate portions 31, 32. Therefore, the operation knob 40 fits in a space between the flat plate portions 31, 32 in the left-right direction.

As shown in FIGS. 5B and 6, the supported member 42 includes a slide-fitting portion 42b having a generally C-shaped cross-sectional configuration. The slide-fitting portion 42b is disposed in a middle portion of the supported member 42 in the vertical direction on a downstream side. A protrusion for press fitting 42c is disposed on at least one of opposite surfaces of the slide-fitting portion 42b.

Assembly of the knob body 41 and the supported member 42 to the downstream fin 30 will be described hereinafter.

To have the operation knob 40 supported by the downstream fin 30, the supported member 42 is attached to the knob body 41 in the following manner: The knob body 41 is brought closer to the slide-supporting portion 50 from the mark piece 53 side and the supported member 42 is brought closer to the slide-supporting portion 50 from the slide-supporting piece 52 side, with the slide-supporting portion 50 sandwiched between the knob body 41 and the supported member 42. The cutout 41g of the knob body 41 and the slide-fitting portion 42b of the supported member 42 are placed in corresponding positions.

As shown in FIG. 5B, the short wall 41c of the knob body 41 is inserted between the flat plate portion 31 and the mark piece 53 and the long wall 41b is inserted between the flat plate portion 32 and the mark piece 53. At this time, the short wall 41c and the long wall 41b are respectively abutted against the flat plate portions 31, 32.

The distal end portion of the long wall 41b is located between the slide-supporting piece 52 and the flat plate portion 32. The distal end portion of the long wall 41b and the slide-supporting piece 52 are pressed into the slide-fitting portion 42b. The catch protrusions 42a, 42a of the supported member 42 are brought to be caught by the catch hole portions 41e, 41e of the knob body 41. Thereby, the operation knob 40 is supported by the slide-supporting piece 52.

The distal end portion of the long wall 41b and the slide-fitting portion 42b are slidable with respect to the slide-supporting piece 52 in the vertical direction with the distal end portion of the long wall 41b and the slide-fitting portion 42b pressed against slide-supporting piece 52. Thereby, the operation knob 40 is slidable with respect to the downstream fin 30 in the vertical direction. As shown in FIG. 3, the slidable region of the operation knob 40 is limited by end faces of the base portion 51 in the vertical direction being abutted against the abutment portions 41f of the upper and lower limiting walls 41d of the knob body 41.

The operation knob 40 is provided with a fork portion 60 for interlocking with the upstream fin 20.

The fork portion 60 extends towards upstream from the supported member 42 of the operation knob 40. A basal end portion of the fork portion 60 is mounted to the supported member 42 on the upstream side of the supported member 42 sandwiched between two mounting portions 42d, 42d disposed spaced from each other in the vertical direction. Each of the mounting portions 42d has a bearing configuration. The basal end portion of the fork portion 60 is pivotally supported by the mounting portions 42d, 42d. Thereby, the fork portion 60 is tiltable in the left-right direction.

A distal end portion of the fork portion 60 is formed in a forked configuration having a slit 61 extending in the front-rear direction. The transmitting shaft 24 of the upstream fin 20 is disposed in the slit 61 in a rotatable and movable manner.

Accordingly, when the operation knob 40 is slid in the vertically direction along the flat plate portions 31, 32 of the downstream fin 30, the transmitting shaft 24 is moved in the vertical direction. Accompanying this movement of the transmitting shaft 24, the upstream fin 20 that includes the transmitting shaft 24 is rotated about the rotation axis L1, and further all of the fins 20 are rotated via the connecting link 23. Thereby, a blow direction is adjusted in the vertical direction. When the operation knob 40 is moved in the left-right direction, the downstream fin 30 is rotated about the rotation axis L2, and the blow direction is adjusted in the left-right direction.

Working of the register device 1 will be described hereinafter.

In FIGS. 1 and 3, the operation knob 40 is in a base position and the upstream fins 20 are generally horizontally oriented. In this position, the operation knob 40 opens an upper end portion of the air inlet 35 of the downstream fin 30, and an air passageway is formed above the operation knob 40.

When the operation knob 40 is slid upward from the base position, the upstream fins 20 are inclined upward and the upper end portion and a lower end portion of the air inlet 35 are opened. Thereby, an air passageway is formed above and below the operation knob 40. When the operation knob 40 is slid further upward, the base portion 51 and the abutment portion 41f of the lower limiting wall 41d are abutted against each other. Thereby, the operation knob 40 is prohibited from sliding upward, the upper end portion of the air inlet 35 is closed and an air passageway is formed below the operation knob 40.

When the operation knob 40 is slid downward from the base position, the upstream fins 20 are inclined downward and the upper end portion of the air inlet 35 is opened wider. When the operation knob 40 is slid further downward, the base portion 51 and the abutment portion 41f of the upper limiting wall 41d are abutted against each other. Thereby, the operation knob 40 is prohibited from sliding downward. At this time, the upstream fins 20 close the air passage 14 as shown in FIG. 2.

According to the embodiment described above, the pair of flat plate portions 31, 32 of the downstream fin 30 look like two fins. Since the operation knob 40 is disposed between the flat plate portions 31, 32 and fits in the space between the flat plate portions 31, 32 in the left-right direction, aesthetic quality can be improved. Further, since the operation knob 40 is formed in a flat configuration so as to be fit in the space between the flat plate portions 31, 32 in the left-right direction, the air passage 14 can have a flattened configuration in the left-right direction.

The technology is not limited to the embodiment described above and various modifications may be adopted without departing from the spirit or scope of the technology.

While the left-right direction and the vertical direction are respectively referred to as the first direction and the second direction in the embodiment described above, the vertical direction and the left-right direction may be respectively referred to as the first direction and the second direction.

The present technology may be applied to a register device for a vehicle for blowing out an air from an air conditioning device or outside of a vehicle body to an interior of the vehicle.

According to at least one embodiment of the present technology, aesthetic quality of the register device can be improved and the air passage of the register body can have a flattened configuration.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

The invention claimed is:

1. A register device for a vehicle comprising:
a register body including an air passage having a configuration in which a dimension in a first direction is smaller than a dimension in a second direction orthogonal to the first direction;
a plurality of first fins supported by the register body so as to be rotatable about a first rotation axis extending in the first direction, the first fins arranged in the second direction;
a single second fin disposed in the air passage at a location on a blow outlet side with respect to the first fins, the second fin supported by the register body so as to be rotatable about a second rotation axis extending in the second direction, the second fin extending in the second direction; and
an operation knob supported by the second fin so as to be slidable in the second direction, the operation knob, as it is slid, rotatably operating the first fins,
wherein the second fin includes a pair of flat plate portions extending in the second direction parallel to each other,
wherein the operation knob is disposed between the pair of flat plate portions so as to be fit in a space between the pair of flat plate portions in the first direction,
wherein an air passageway is formed in the space between the pair of flat plate portions, and wherein the operation knob, as it is slid, is formable the air passageway on opposite sides, one side or the other side of the operation knob in the second direction,
wherein an air inlet is formed in the space between the pair of flat plate portions of the second fin on an upstream side, the air inlet extending in the second direction, the air inlet formed corresponding to a slidable region of the operation knob, and wherein the operation knob, as it is slid, opens opposite end portions, one end portion or the other end portion of the air inlet in the second direction to form the air passageway, and
wherein the air inlet is formed in a middle portion of the second fin in the second direction, and wherein a closing portion that connects upstream ends of the pair of flat plate portions to close the space between the pair of flat plate portions is disposed on opposite sides of the air inlet in the second direction.

2. The register device for the vehicle according to claim 1, wherein the second fin includes a slide-supporting portion disposed in one of the pair of flat plate portions, the slide-supporting portion slidably supporting the operation knob, and wherein a dimension of the slide-supporting portion in the second direction is smaller than a dimension of the operation knob in the second direction.

3. A register device for a vehicle comprising:
a register body including an air passage having a configuration in which a dimension in a first direction is smaller than a dimension in a second direction orthogonal to the first direction;
a plurality of first fins supported by the register body so as to be rotatable about a first rotation axis extending in the first direction, the first fins arranged in the second direction;
a single second fin disposed in the air passage at a location on a blow outlet side with respect to the first fins, the second fin supported by the register body so as to be rotatable about a second rotation axis extending in the second direction, the second fin extending in the second direction; and
an operation knob supported by the second fin so as to be slidable in the second direction, the operation knob, as it is slid, rotatably operating the first fins,
wherein the second fin includes a pair of flat plate portions extending in the second direction parallel to each other,
wherein the operation knob is disposed between the pair of flat plate portions so as to be fit in a space between the pair of flat plate portions in the first direction, and
wherein the second fin includes a slide-supporting portion fixedly disposed in one of the pair of flat plate portions, the slide-supporting portion slidably supporting the operation knob. and wherein a dimension of the slide-supporting portion in the second direction is smaller than a dimension of the operation knob in the second direction.

4. The register device for the vehicle according to claim 3, wherein the slide-supporting portion is fixed to an opposite surface of one of the pair of flat plate portions in a cantilever manner.

5. The register device for the vehicle according to claim 3 or 4, wherein the operation knob includes limiting walls in opposite ends thereof in the second direction, the slide-supporting portion is disposed between the limiting walls and sliding of the operation knob in the second direction is limited by abutment between the limiting walls and the slide-supporting portion.

* * * * *